Jan. 7, 1964 R. REARWIN 3,117,316
VARIABLE TRACKER RADAR SYSTEM
Filed Feb. 24, 1959 3 Sheets-Sheet 1
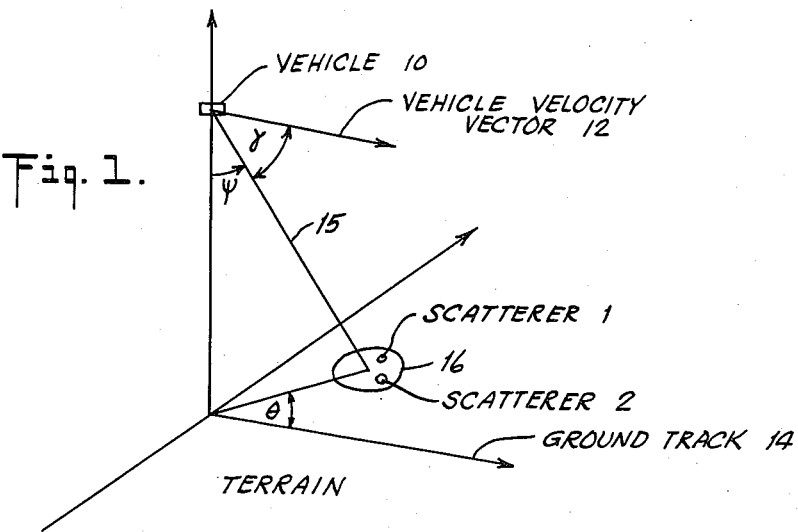
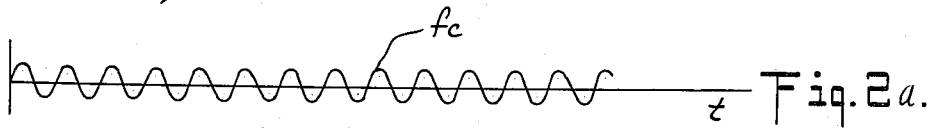
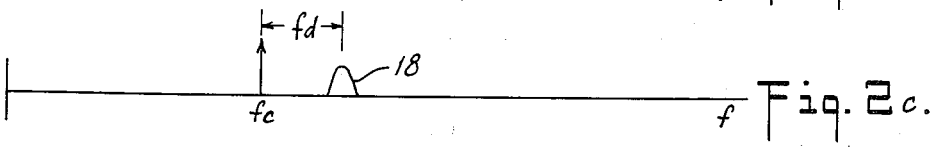
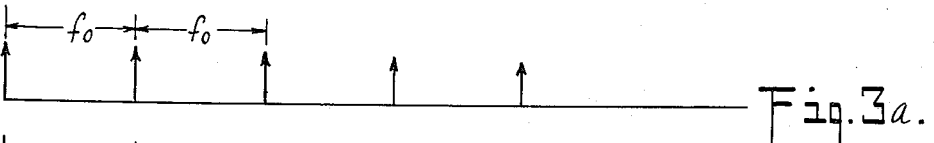
INVENTOR.
RICHARD REARWIN
BY Darby & Darby
ATTORNEYS

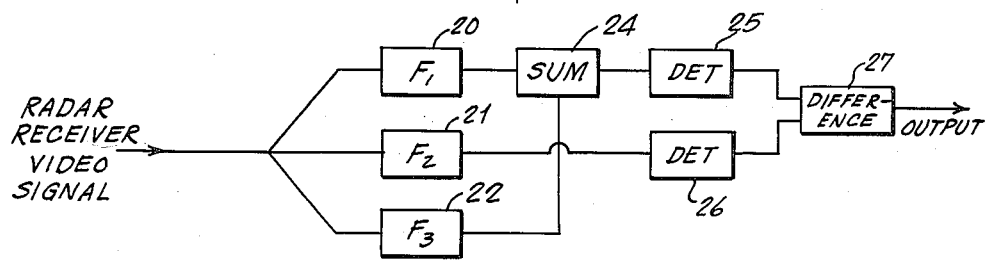
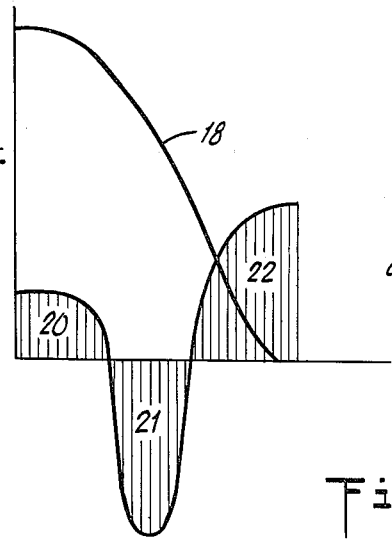
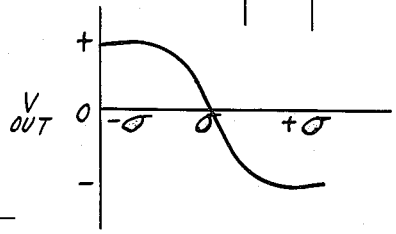
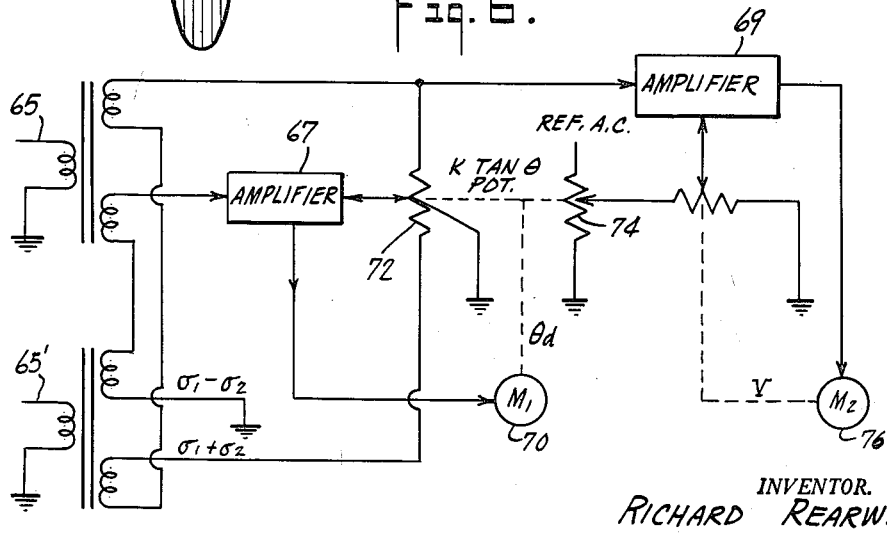

Jan. 7, 1964 R. REARWIN 3,117,316
VARIABLE TRACKER RADAR SYSTEM
Filed Feb. 24, 1959 3 Sheets-Sheet 3

INVENTOR.
RICHARD REARWIN
BY Darby & Darby
ATTORNEYS

United States Patent Office 3,117,316
Patented Jan. 7, 1964

3,117,316
VARIABLE TRACKER RADAR SYSTEM
Richard Rearwin, Mineola, N.Y., assignor to TRG, Incorporated, Syosset, Long Island, N.Y., a corporation of New York
Filed Feb. 24, 1959, Ser. No. 795,284
33 Claims. (Cl. 343—8)

This invention relates to radar systems and more particularly to a variable spectrum width tracker for measuring the spectrum width of a doppler spectrum.

In many applications it is desirable to make accurate measurements of certain physical quantities of the environment in which a vehicle moves. One such application would be in an aircraft where it is often necessary to make precise measurements of the aircraft velocity and drift angle, which measurements are used for navigation purposes and in the weapons systems of the aircraft for precision radar bombing, and/or for radar fire control purposes. One way to accomplish such measurements is by a radar system of the doppler type, which may be a separate system, or else to use the main radar system of the aircraft with a doppler adapter. In either case, the doppler effect is utilized to obtain the necessary information.

Generally, the manner in which the desired measurements are made by a doppler radar system is by transmitting a beam of energy to illuminate a patch of the terrain over which the aircraft is flying. The beam of energy which is reflected back to the aircraft and received is shifted in frequency by an amount which is dependent upon the velocity of the aircraft with respect to the terrain. Also, because the antenna beamwidth is not infinitesimal and because the period of illumination of scatterers is limited, a doppler spectrum is formed at the second detector of the radar receiver which has a frequency bandwidth which is dependent, among other quantities, upon the velocity of the aircraft, the drift angle of the aircraft, the frequency of transmission of the beam of energy, the antenna beamwidth and the position of the radar antenna with respect to the aircraft axis. By measuring the spectrum width of the doppler spectrum by means of a suitable frequency tracker and by performing computations involving this spectrum width, it is possible to determine the aircraft velocity and drift angle.

One such type of doppler radar system utilizes a scanning type antenna and a fixed frequency tracker. In this system, the antenna is scanned to positions on each side of the aircraft axis until a doppler spectrum is produced which in turn produces a predetermined level output signal from the fixed frequency tracker. The angle of antenna scan needed to produce the predetermined output signal is therefore a function of the aircraft velocity and drift angle and computations are performed, either manually or automatically, to compute these quantities.

In certain types of aircraft, the radar antenna is covered by a radome, which is used to protect the radar antenna from weather and also to preserve the aerodynamic qualities of the aircraft. In many cases, the configuration of the radome affects the beamwidth of the antenna, when the antenna is scanned from one position to another, in a manner such that variations are produced in the doppler spectrum width. These variations of spectrum width introduce errors in the calculation of the aircraft velocity and drift angle. To eliminate the error caused by the scanning antenna when a radome is used, it is desirable to use an antenna which is fixedly positioned on each side of the aircraft axis when the doppler measurements are made. Due to the wide range of velocities and drift angles which the airplane encounters, the fixed antenna position causes the production of doppler spectra of different widths. This variation in the frequency widths of the doppler spectra necessitates the use of a variable tracker for measuring the width of the doppler spectrum since a fixed type tracker could not accurately measure a wide range of spectrum widths in the time permitted for such a measurement.

The present invention relates to a doppler radar system in which the doppler measurements are made with the radar antenna at fixed positions and a variable tracker is provided to determine the frequency widths of the doppler spectra.

It is therefore an object of this invention to provide a doppler radar system.

Another object of this invention is to provide a doppler radar system which utilizes a variable tracker for measuring the widths of doppler spectra.

A further object of this invention is to provide a doppler radar system which utilizes a variable tracker for measuring the widths of doppler spectra in an incoherent type radar system.

Yet another object of this invention is to provide a doppler radar system wherein the doppler measurements are made with the radar antenna located at fixed angles with respect to the aircraft axis.

Other objects and advantages of this invention will become apparent from a consideration of the following specification and annexed drawings in which:

FIGURE 1 is a diagram used in the explanation of the doppler effect;

FIGURES 2a–2c show the formation of the doppler spectrum for a coherent type radar transmitter;

FIGURES 3a–3b are graphical representations of the formation of the doppler spectrum for an incoherent type radar transmitter;

FIGURE 4a is a schematic representation of one form of a frequency tracker;

FIGURES 4b–4c are graphical representations of certain of the characteristics of the frequency tracker of FIGURE 4a;

FIGURE 6 is a schematic block diagram of one form of a computer which is used to compute the velocity and drift angle from the information supplied by the variable tracker system.

Figure 5:
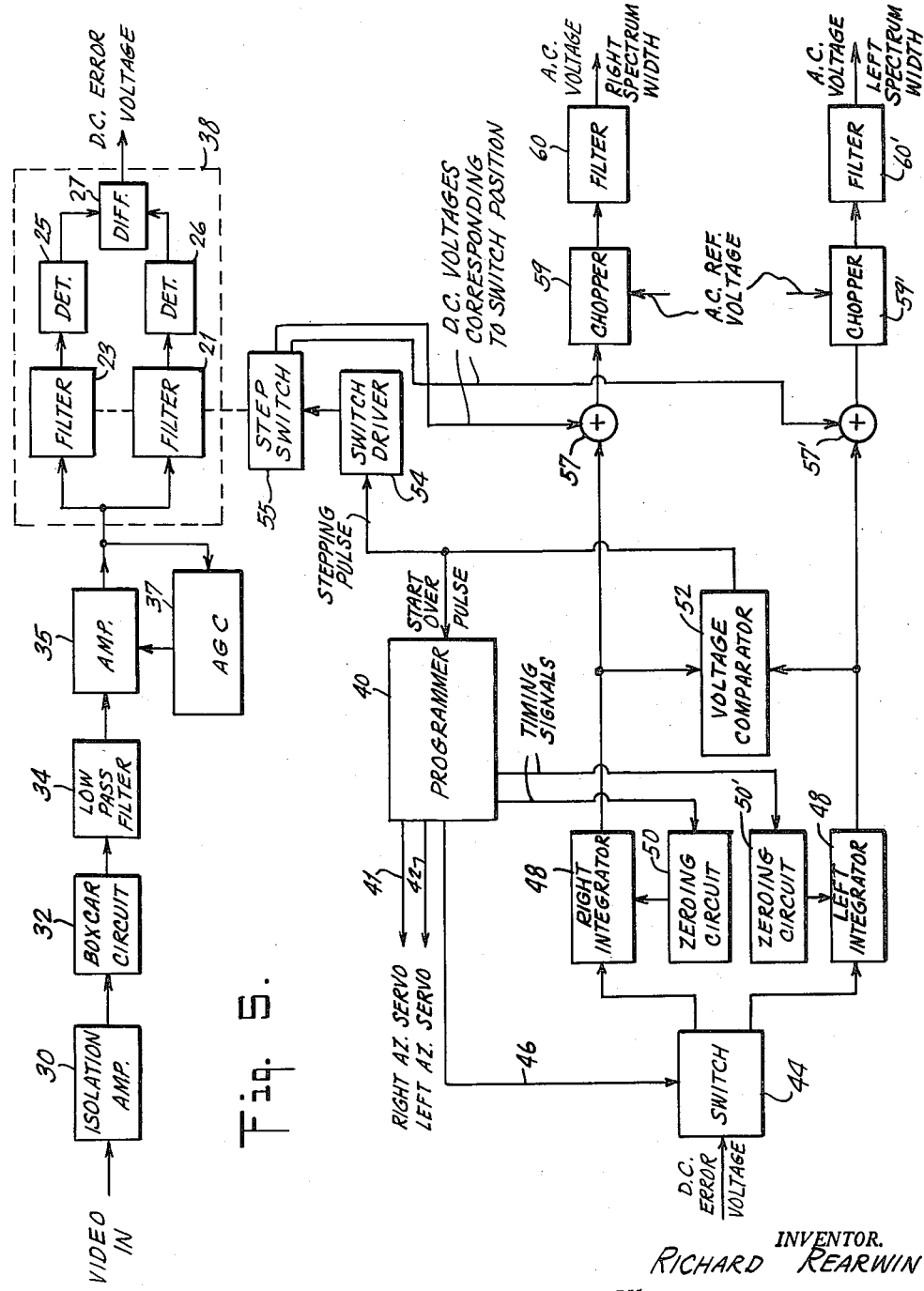
FIGURE 5 is a schematic block diagram of the variable tracker system.

Referring to FIGURE 1, a moving vehicle 10 such as an aircraft, is shown as traveling along a course such that it has a velocity vector 12. The projection of this velocity vector 12 on the terrain, either land or water, over which the vehicle is moving, is the ground track 14. The vehicle 10 has a radar transmitter which transmits a beam of radiant energy of a predetermined frequency along the ray line 15 toward the terrain. This beam of energy spreads out from the transmitting antenna and illuminates a patch of terrain 16 which may be considered as having a number of "scatterers," i.e. objects from which a radar beam is reflected, such as, leaves, branches, metal objects, water, etc., therein.

When the beam of radiant energy strikes a scatterer, some of it is reflected back to the vehicle where it is picked up by a receiver antenna. In the usual case, the same antenna is used for both the transmitter and receiver portions of the radar system. This is accomplished by means of a suitable duplexer and TR system. Due to the doppler effect, brought about by the velocity of the vehicle, the wave reflected by each scatterer to the radar receiver is shifted in frequency from the transmitted wave by an amount equal to:

(1) $$f_d = \frac{2V}{\lambda} \cos \gamma = \cos \theta \sin \psi$$

where:

$f_d$ is the doppler frequency shift;
V is the velocity of the vehicle;
$\lambda$ is the wavelength of the radiation;
$\gamma$ is the angle between the ray illuminating the scatterer and the velocity vector of the aircraft;
$\theta$ is the angle between the ground track and the projection of the antenna ray on the ground; and
$\Psi$ is the elevation angle to the antenna ray line from the vertical.

If the beam of radiant energy which was used to illuminate the patch of scatterers 16 was produced by a coherent transmitter, meaning that the phase of the waveform before detection at the radar receiver second detector is continuous from pulse to pulse, then a patch of illuminated scatterers return a signal whose average doppler frequency shift, i.e. shift of the center frequency of the doppler spectrum from the transmitter carrier frequency, is given by Equation 1. This effect is shown in FIGURES 2a, 2b, and 2c, wherein FIGURE 2a represents the output waveform of a coherent radar transmitter of the C.W. type which transmits a coherent wave at a carrier frequency $f_c$. In the idealized case represented by Equation 1, the carrier frequency $f_c$ is shifted by an amount $f_d$ upon reflection from the patch of scatterers 16. This is shown in FIGURE 2b. In an actual case, since the scatterers in the patch 16 subtend different $\gamma$ angles with the vehicle's velocity vector 12, a range of doppler frequency shifts are produced. The range of doppler shifts form a doppler spectrum which is centered at the average doppler frequency $f_d$. In the coherent transmitter system, the frequency at which the doppler spectrum is centered is equal to the carrier frequency $f_c$ plus the doppler frequency shift $f_d$, given by Equation 1. This situation is shown in FIGURE 2c, where the doppler spectrum is designated by reference numeral 18. The width of the doppler spectrum 18, which is measured in cycles per second, is designated $\sigma_g$ and is usually described as being due to geometric effects.

The width of the doppler spectrum is broadened if the scatterers within the illuminated patch are moving with respect to each other. The width of the spectrum is also broadened due to the limited duration of illumination of a patch of scatterers because of the vehicle motion. These two factors can be made negligible in comparison to the geometric spectrum width $\sigma_g$ by proper antenna beam orientation and for all practical purposes they may be disregarded. Another spectrum broadening factor which must be considered is that which is due to the scanning motion of the antenna beam. This affects the spectrum width since the spectrum width due to antenna scanning is given by the ratio of the antenna scanning rate to the antenna beamwidth. In many cases, the spectrum broadening due to the antenna scanning is not negligible and therefore cannot be disregarded. Due to the non-symmetrical geometric configurations of many radomes, which are used to cover the radar antenna, the antenna beamwidth is altered by the radome and becomes a function of antenna position with respect to the radome.

If the effective illuminating waveform is from a pulsed type radar transmitter which is not of the coherent type, meaning that there is an arbitrary phase change at each pulse, the spectrum of the doppler return is centered at a frequency of zero cycles per second and at harmonics of the transmitter pulse repetition frequency rather than at the frequency $f_c + f_d$ shown in FIGURE 2c. FIGURE 3a shows the spectral lines of the spectrum of a pulse type incoherent radar transmitter which is transmitting a pulse of energy at a pulse repetition rate $f_0$. FIGURE 3b shows the spectrum of the doppler return at the second detector for the pulse of this incoherent transmitter. It can be seen that the spectrum of the doppler return is centered at the frequency of zero cycles per second and at harmonics of the repetition frequency rather than being shifted by an amount equal to the average doppler frequency of Equation 1.

The width of the spectrum of FIGURE 3b is also affected by the considerations previously discussed with reference to FIGURES 2a, 2b, and 2c.

At the second detector of an incoherent radar system, the returns from all scatterers whose echoes overlap in time demodulate each other coherently. This is shown below.

The waveform of the return in the intermediate frequency amplifier strip from scatterer 1 (see FIGURE 1) in the illuminated patch is given by:

(2) $$\cos[(w_{1f}+f_{d_1})t+\phi_i]$$

and the return from scatterer 2 in the illuminated patch is given by:

(2a) $$\cos[(w_{1f}+f_{d_2})t+\phi_i]$$

where $f_{d_1}$ and $f_{d_2}$ are the doppler shifts associated with the scatterers' positions in the illuminated patch, and where $\phi_i$ is the random phase with which the transmitter commences oscillation on the $i$th pulse. At the second detector, these two returns coherently demodulate each other giving rise to a low frequency term of the form:

(2b) $$\cos(f_{d_1}-f_{d_2})t$$

which is independent of the phase with which the transmitter commences oscillation and, in this sense, coherent. In fact, the output of the second detector consists of the sum of all possible difference doppler frequencies returned from the many individual scatterers in the illuminated patch.

Due to the coherent demodulation, a spectrum is formed consisting of the difference of the doppler frequency shifts associated with those scatterers in the illuminated patch whose return echoes overlap in time. This spectrum is called a differential doppler spectrum.

The differential doppler spectrum width, if the geometric factor predominates, is given by the following equation:

(3) $$\delta_s = \frac{2V}{\lambda} \sin\gamma \Delta\gamma$$

where $\Delta\gamma$ is the antenna beamwidth in the $\gamma$ direction, and $\gamma$ is the angle between the aircraft's velocity vector 12 and the ray line 15 to the center of the illuminated patch.

The exact expression for the geometric spectrum width depends on several factors. Among these are the antenna pattern, the pulse length of the transmitted pulse, the $\theta$ and $\psi$ angles and the time duration of the range gate of the system (if one is used). Generally, there are two components to the geometric spectrum width, $\sigma_g$, corresponding to the two dimension of the illuminated patch. Usually one of these dimensions is determined by the antenna beamwidth and is given by the equation:

$$\delta_{g_2} = \frac{2V}{\lambda}\sin\gamma\Delta\gamma$$

which is the same as Equation 3, or (3a) $$\delta_{g_1} = \frac{2V}{\lambda}\Delta\xi \sin\theta$$

where $\Delta\xi$ is the antenna azimuthal beamwidth. The other component is determined by the pulse length, assuming it equals the range gate width, and is given by the following equation:

(4) $$\delta_{g_2} = \frac{2V}{\lambda}\cos\theta\cos\psi\Delta\psi$$
$$= \frac{2V}{\lambda}\cos\theta\frac{\cos^2\psi}{\sin\psi}\frac{c\tau}{2R}$$

where:

$c$ is the velocity of propagation of the radiated beam;
$\tau$ is the pulse length of the transmitted beam;

R is the slant range (line 15);
$\psi$ is the elevation angle to the antenna ray from the vertical; and
$\Delta\psi$ is the virtual antenna beamwidth in the elevational direction due to the range gate.

For many antenna patterns and geometries, the total geometric spectrum width is the square root of the sum of the squares of the two components given above in Equations 3a and 4:

$$(5) \qquad \delta_g = (\delta_{g_1}^2 + \delta_{g_2}^2)^{1/2}$$
$$= \frac{2V}{\lambda}(\rho \sin^2 \theta + \eta \cos^2 \theta)^{1/2}$$

where:

$\rho = (\Delta \xi)^2$ and
$\eta = \frac{\cos^4 \psi}{\sin^2 \psi} \left(\frac{c\tau}{2V}\right)^2$ Referring to Equation 5, it can be seen that the spectrum width at the output of the second detector of an incoherent radar transmitter is dependent upon the angle $\theta$ and the vehicle velocity V. The angle $\theta$ itself is the sum of two angles which may be represented as:

$$\theta = \theta_0 + \theta_d$$

where $\theta_0$ is the azimuth angle of the beam center relative to the axis of the vehicle; and $\theta_d$ is the drift angle. Therefore, by measuring the width of the differential doppler spectrum, both the drift angle and the ground velocity may be obtained.

It can be seen from Equation 5 that an elevation angle $\psi$, pulse width $\tau$ and slant range R can be chosen so that $\rho = \eta$. This makes the geometric doppler spectrum width $\sigma_g$ insensitive to changes in the angle $\theta$ (since $\sin^2 \theta + \cos^2 \theta = 1$)

and therefore not usable in the measurement of the drift angle $\theta_d$. By choosing a large enough elevation angle $\psi$ or slant range R, $\eta$ can be made much smaller than $\rho$ so that the geometric doppler spectrum is made dependent upon the angle $\theta$ and therefore dependent upon the drift angle $\theta_d$. It can also be seen from Equation 5 that as long as $\eta$ is made much smaller than $\rho$ and the angle $\theta$ is kept fairly large, that the effect to the spectrum width which is contributed by the $\sigma_{g_2}$ term of Equation 4 is substantially negligible. Therefore the geometric spectrum width $\sigma_g$ may be given by:

$$(5a) \qquad \delta_g = \frac{2V}{\lambda} \sin \theta \Delta \xi$$

which is the same as Equation 3a. Since the antenna beamwidth $\Delta \xi$ is equal to $$\frac{k\lambda}{D}$$

where D is the antenna aperture, Equation 3a may now be written as:

$$(6) \qquad \delta_g = \frac{2Vk}{D} \sin \theta$$

It has been found that the constant $2k$ in the expression for $\sigma_g$ is a quantity which varies from system to system depending on antenna aperture illumination, etc. In a typical doppler system the constant has a value of about 1.2. This constant may vary from system to system depending on radome and antenna design. This variation in the doppler calibration constant has no effect on the measurement of velocity and drift angle, since it is a fixed quantity which may be adjusted for in the system computer, especially in a variable tracker system where the antenna always looks through the same portion of the radome.

By making two measurements of $\sigma_g$ at fixed angles $\theta_0$, with respect to the vehicle axis, preferably one to the left and one to the right of the axis, the velocity of the vehicle and the drift angle $\theta_d$ may be determined. This is true because the two measurements will produce signals which are representative of two equations with only two unknowns (V and $\theta_d$ since $\theta = \theta_0 \pm \theta_d$). These two equations may be solved by suitable electrical or electromechanical means to determine the vehicle velocity and the drift angle.

In order to solve for the velocity and drift angle, it is necessary that an accurate measurement be made of $\sigma_g$, the doppler spectrum width. In a preferred form of the invention, this is accomplished by the filter-detector (tracker) arrangement shown in FIG. 4. The video signal from the second detector of the radar receiver, which contains the doppler spectrum, is applied to the inputs of three filters 20, 21, and 22. The passband characteristics for each of these filters is shown in FIGURE 4b. As can be seen, filter 20 is effectively a lowpass filter, filter 22 a highpass filter and filter 21 a bandpass filter having its pass band lying between the cutoff frequencies of filters 20 and 22. Superimposed on the filter characteristics of FIGURE 4b for comparison purposes is one-half of the spectrum of the doppler spectrum 18.

The output of filters 20 and 22 are connected to a summing network 24 which effectively makes filters 20 and 22 a single filter having the bandpass characteristics shown for the two individual filters. This result may also be accomplished by constructing a single filter having the characteristics of filters 20 and 22. The output of the summing network 24 is connected to the input of a detector circuit 25 and the output of the bandpass filter 21 is connected to the input of another detector circuit 26. The detector circuits 25 and 26 serve to demodulate the A.C. components at the output of the respective filters and to produce a D.C. voltage which is representative of the energy of the signals passed by the respective filters. The detectors 25 and 26 may be any suitable energy detectors, for example, a bolometer or a diode demodulator, etc. The output of the detectors 25 and 26 are connected to a difference circuit 27 which serves to take the difference of the output voltages of the detectors 25 and 26.

FIGURE 4c shows the output voltage of the difference circuit 27 for a typical frequency tracker. It can mathematically be shown that various arrangements of filters 20, 21 and 22, having different pass band characteristics, can be provided which produce a zero output voltage (error voltage) at the output of the difference circuit 27 for a spectrum of a particular width $\sigma$. If the width of the spectrum measured by a particular filter arrangement is greater or less than the spectrum width for which the particular filter arrangement was designed to measure and produce a null output, a respective negative or positive voltage is produced at the output of the difference circuit 27. For example, suppose the filter arrangement of a tracker is designed to produce a null output for a frequency of 250 cycles per second. When a doppler spectrum of a width of 250 cycles is supplied to the input of the filters, then the output of the difference circuit 27 is zero volts. However, suppose that the velocity and drift angle of the vehicle are such that the doppler spectrum produced at the output of the radar receiver second detector is only 100 cycles per second. In this case, the output of the difference circuit 27 is a positive voltage which indicates that the differential doppler spectrum width is narrower than the spectrum for which the tracker is tuned. On the other hand, if the spectrum supplied to the input of the filters is greater than 250 cycles per second, a negative voltage is produced at the output of the difference circuit 27, indicating that the differential doppler spectrum width is wider than the spectrum width for which the tracker is tuned.

It may be mathematically calculated that a certain arrangement of filters for a tracker produces a zero voltage output for a certain doppler spectrum. For non-zero tracker output voltages, the output voltage is linear when the spectrum being measured is near the null spectrum width. If the range of spectrum to be measured is small enough, then a fixed tuned tracker may be used to measure any spectrum width within this range, merely by calibrating the tracker output. However, if the desired range of spectrum widths is too large, a variable tracker must be provided. The measurement of the doppler spectrum over a wide range of frequencies can be accomplished accurately by providing separate sets of filters or by tuning a single set to produce a null output at the difference circuit 27 for a particular spectrum widths. When the null output is produced, it is only necessary to ascertain which of the filter sets was used to produce it or to ascertain the tuning of the ingle filter set, in order to determine the spectrum width.

Filter 20, 21 and 22 are preferably of the variable type, for example an RC filter in which either the resistance or the capacitance parameter is made variable. Therefore, by tuning the filters until a null output is produced at the output of the difference circuit 27 the spectrum width of any spectrum may be ascertained.

The filters 20, 21 and 22 must have a very definite transfer characteristic, if they are most sensitively to detect a change in spectrum width. The most sensitive filter transfer characteristic varies with the spectrum width as well as with the tracker bandwidth. Thus as the spectrum width changes the filter characteristic changes.

As previously pointed out, the radome which covers the radar antenna affects the boresight of the antenna (the $\gamma$ angle), as well as the beamwidth of the antenna, differently at various positions of the antenna with respect to the radome. Therefore, if measurements of the vehicle velocity and drift are taken with the antenna scanning, an error in the measure of the velocity and the drift angle is introduced. Therefore, it is desirable to utilize a measurement system wherein the antenna is located at a fixed position with respect to the radome at the time the measurement is to be made. The beamwidth of the antenna at this fixed position can be measured and a known, constant quantity for D of Equation 6 produced. This is necessary in the final computation of the velocity and drift angle.

In a system such as this, the doppler measurement is made with the antenna held stationary at a fixed angle $\theta_0$, with respect to the vehicle axis, on each side of the vehicle axis. The antenna is therefore fixed relative to the radome and hence the vehicle axis. In this case, the spectrum width of the return signal can vary over wide limits depending upon the vehicle velocity and drift angle, but no significant velocity and drift angle errors can be introduced by the effect of the radome on the antenna beamwidth or boresight.

Since the spectrum width can vary over wide limits, in accordance with the velocity of the vehicle and its drift angle, a variable frequency tracker system is needed to measure the widths of the spectra of the video signals which are returned from the scatterers. One type of variable tracker system which may accomplish this function is shown in FIGURE 5. In general, the system of FIGURE 5 operates on the basis of converting the width of the frequency spectrum into an output error voltage. This is accomplished in a preferred form of the invention by a frequency tracker which is arranged in a manner so that the output voltage of the tracker varies linearly as a function of the frequency width of the spectrum.

Since the spectrum width is variable due to the range of velocities and drift angles which the vehicle encounters, the tracker arrangement is also made variable so that the frequency range of the spectrum may be tracked and measured. This is accomplished in a preferred form of the invention by providing an arrangement where the tuning of the filters which form the tracker is changed by means of a stepping switch. The stepping switch is connected to the filter elements so that a change in switch position changes the filter parameters. For any given setting of the stepping switch, the error voltage produced by the tracker equals zero if the filter arrangement of the tracker is tuned to the proper frequency range for the spectrum width being measured. As the stepping switch position is varied, the spectrum width for zero voltage output for the frequency tracker changes. The frequency tracker can then be calibrated in terms of output voltage versus input spectrum width. By utilizing the stepping switch arrangement and the variable tuning of the filters, many filters are used having overlapping ranges of spectrum widths and therefore the complete range of the spectrum widths produced by the receiver may be tracked. Given the knowledge of the null spectrum width, as shown by the stepping switch setting and the tracker output voltage, any spectrum width in the desired range can be measured.

Referring to FIGURE 5, the video output signal from the radar receiver second detector is applied to an amplifier 30 which is used to isolate the variable tracker from the remainder of the radar receiving system and to provide impedance matching between the radar receiver and the variable tracker. The isolation amplifier 30 may be any suitable amplifier, for example, a cathode follower.

The output of the isolation amplifier 30 is applied to a boxcar detector circuit 32 which is a high quality video detector circuit and which is also used to clean up the doppler spectrum being measured by removing noise, etc. The boxcar detector circuit is well known in the art and needs no further description here.

The output of the boxcar circuit 32 is passed through a low pass filter 34 which is designed to have a cut-off frequency to eliminate the harmonics of the pulse repetition rate and their spectral sidebands. This is done so that only one spectrum is applied to the filter-detector (tracker) circuits which measure the width of the spectrum.

The output of the low pass filter 34 is amplified by means of a high quality amplifier 35, which has an accurate automatic gain control circuit 37 connected to it. The amplifier 35 and the automatic gain control circuit 37 serve to preserve a constant signal level to the input of the tracker no matter what the variation of the input video signal level to the isolation amplifier 30.

The doppler spectrum which is present at the output of the amplifier 35 is applied to the input of a tracker circuit 38 which is similar to the circuit described with respect to FIGURES 4a–4c. In FIGURE 5 the filters 20 and 22 and the summing circuit 24 are enclosed within the single block represented by the reference character 23. The function of the circuit 38 is the same as that previously described with respect to FIGS. 4a–4c and briefly restated, if the tuning of the filters 20, 21 and 22 is such as to produce a null voltage at the output of the difference circuit 27 then a spectrum of a predetermined width is known to be present at the input of the filters. However, if the spectrum width is greater or less than the spectrum which is required for the null signal, a negative or a positive voltage is produced at the output of the difference circuit 27. It can be seen in FIGURE 4c that the output voltage of the difference circuit 27 is quite linear when the spectrum width is near the null spectrum width. If desired, the tracker 38 can be calibrated in terms of output error voltage versus input spectrum width, with the null voltage point being indicative of a certain spectrum width and any voltages which are greater or less than the null being indicative of spectrum widths which are less than or greater than the certain spectrum width.

A programmer 40 is provided to control the operation of the variable tracker system. The programmer serves to control the position of the radar antenna with respect to the vehicle axis and at the same time also switches the error voltage produced at the output of the difference circuit 27, by means of a switch 44, to a left or a right channel. These channels make the spectrum width measurements when the antenna is respectively positioned to the left or the right of the vehicle axis. The signals produced in the left and right channels are supplied to a computer which then calculates the vehicle velocity and drift angle.

In a typical operating cycle, the programmer 40 provides signals over lines 41 and 42 to the antenna azimuth servos to position the antenna at a fixed angle either to the left or to the right of the vehicle axis. The antenna is held in a fixed position for a period necessary to accomplish the measurement. This period is called the measuring cycle. In the present case, consider that the programmer 40 sends a signal over line 41 to position the radar antenna at a fixed angle to the right of the vehicle axis. When the antenna is properly positioned, the reflected signal is supplied from the video detector of the radar receiver to the isolation amplifier 30 and the error voltage is produced at the output of the difference circuit 27.

The error voltage present at the output of difference circuit 27 is applied to the input of switch 44 which operates under the control of signals supplied by the programmer 40. At the same time that the programmer 40 supplies a signal to the right azimuth servo of the antenna to position the antenna to the right of the vehicle axis, a signal is supplied to the switch 44 over line 46 so that the error voltage applied to the switch 44 is directed to an integrator circuit 48 in the right channel. The integrator 48 stores the information of the error voltage produced by the difference circuit 27 when the radar antenna is positioned to the right of the vehicle axis. A similar integrator 48' is provided to store the error information produced by the tracker 38 when the antenna is positioned to the left of the vehicle axis.

The error voltage which is directed from the switch 44 into the right channel integrator 48 is integrated for a prescribed amount of time which is called the averaging time. After the termination of the measuring cycle and the integration, which is when the antenna starts to move from the right to the left of the vehicle axis, the integrator output voltage is directly proportional to the average error voltage that existed during the measurement interval. A zeroing circuit 50 is connected to the integrator 48 and is operated by signals from the programmer 40 at the beginning of each measurement cycle to remove the error voltage which was stored during the previous measurement cycle. The integrator 48 may be a simple RC network, and the zeroing circuit 50 may therefore be a relay which momentarily shorts out the capacitor at the very beginning of the measurement cycle, and thereby removes the previous charge stored on the capacitor.

A voltage comparator circuit 52 is connected to the output of the integrator 48. The comparator 52 is set to levels which are representative of the tracker producing an error voltage when the input spectrum is outside of the range of frequencies which can accurately be measured by the particular tuning of the filters 20–22. If during the integration time of the measurement cycle the integrator output voltage exceeds the specified voltage limit of the comparator 52, which indicates that the input spectrum width is either too large or too small as compared to the null spectrum width of the filter tuning which is presently set into the tracker 38, a pulse is generated by the comparator 52 and is used to control a switch driver 54. The switch driver 54 in turn controls a stepping switch 55, preferably of the bi-directional type, which serves to change the tuning of the filters 20–22 of the filter-detector circuit. This may be accomplished in any of a number of ways. For example, if RC filters are used for the filters 20–22, the stepping switch 55 can switch in different values of resistance and capacitance for the filter circuits 20–22.

The type of pulse generated by the comparator 52 is determined by and is indicative of whether the spectrum width being measured is too large or too small as compared to the null spectrum width set into the tracker 38.

The generated pulse controls the switch driver 54 to drive the stepping switch 55 to change the tuning of the filters 20–22 in a direction so that the new null spectrum width of the tracker is closer to the width of the spectrum being measured. For example, if the width of the spectrum being measured is greater than the pre-set null spectrum width of the tracker, a pulse indicative of this condition, e.g. a negative pulse, is generated by the comparator 52. This pulse drives the stepping switch 55 in a direction to make the new pre-set null spectrum width of the tracker 38 greater than the previous pre-set null spectrum width, as determined by the setting of the step switch 55. If the spectrum width being measured is less than the null spectrum width of the tracker 38, a positive pulse is generated by the comparator 52 and the switch 55 is driven in the opposite direction. In this manner, the position of the stepping switch 55 varies the tuning of the filters 20–22 in successive steps until the null spectrum width of the tracker 38 is approximately equal to the width of the spectrum being measured.

At the same time that a pulse is generated to operate the stepping switch 55, a start-over pulse is applied from the comparator 52 to the programmer 40. The start-over pulse tells the programmer that the spectrum has not been accurately measured and therefore to keep the antenna positioned at the same spot and also to keep the switch 44 in a position to direct the error voltage from the difference unit 27 to the same channel. The operation of tuning the filters to successive steps by means of the stepping switch 55, which is operated in response to a pulse produced by the voltage comparator 52 when the error voltage is excessive, continues until an integrator output voltage is produced within the specified limits set into the comparator 52. When the output of the integrator 48 is within the limits set into the comparator 52, no stepping pulse is produced and the stepping switch maintains that position. By reading the position of the stepping switch 55, the tuning of the filters 20–22 may be ascertained and therefore the measurement of the spectrum width is determined.

In order to automatically determine the width of the spectrum, each position of the stepping switch is represented by a D.C. voltage. This may be accomplished, for example, by providing a bleeder network across the stepping switch so that each position of the switch taps off a different voltage from the bleeder network. The D.C. voltage which is produced by the network connected to the stepping switch 55, is proportional to the null spectrum width corresponding to each step switch position. The output of the integrator 48 is added to the voltage which is proportional to the stepping switch position in an adding network 57. The total D.C. voltage present at the output of the adder 57 is therefore proportional to the measured spectrum width. Stated another way, the voltage present at the output of the adder 57 comprises two components. The first component is a D.C. voltage which is representative of the stepping switch position and therefore the tuning of the filters 20–22 for a null error voltage output for a specified spectrum width. The other component is the error voltage at the output of the integrator 48 which is representative of how far from the pre-set null spectrum width that the actual spectrum is. The voltage sum of these two components is therefore representative of the actual spectrum width. In this manner an accurate measurement of a wide range of spectrum widths may be accomplished.

The output of the adder 57 is supplied to a chopper circuit 59, which operates at the same frequency as the power supply of the vehicle in which the radar system is located, and converts the D.C. signal to an A.C. signal for convenience for computational purposes. Chopper 59 may be any suitable device, for example, a vibrator. The output of the chopper 59 is connected to a filter 60 which has a bandpass centered around the alternating current frequency supplied to the chopper 59. The output voltage of the filter 60 is therefore an A.C. voltage at the frequency of the vehicle power supply whose amplitude is representative of the spectrum width measured with the antenna of the radar system at a fixed angle to the right of the aircraft axis. This signal is used in the calculation of the velocity and the drift angle.

The operation of the left channel for measuring the spectrum width with the antenna of the radar system at a fixed angle to the left of the vehicle axis is similar to that previously described with respect to the right channel. Following the integration of an error signal derived from an antenna beam positioned to the right side of the ground track, the programmer 40 swings the antenna around to the required position on the other side of the ground track by supplying a signal to the left azimuth servo line 42. Simultaneously, the programmer 40 also switches the error signal from the right channel integrator 48 to a similar left channel integrator 48'. The output of the integrator 48' is compared in the voltage comparator 52 with the fixed reference levels and the stepping switch 55 is operated to seek a position until the filters 20–22 are tuned to produce an error signal within the specified measurable limits. The output of the integrator 48' is added to the D.C. voltage which corresponds to this switch position and this voltage is chopped by a chopper 59' and filtered and supplied to the computer by means of a filter 60'.

Due to the provision of the two integrators 48 and 48', the error signals are stored in the integrator circuits so that following the measurement cycle the computer can perform the necessary computations with both integrated signals, the left and the right spectrum widths, readily available to it. This storage function may also be accomplished using suitable electromechanical components such as motors, clutches, etc. at a later stage in the computer itself, but the integrator is preferred in order to conserve weight.

If desired, a memory device may be included in the programming circuits 40 to remember the stepping switch positions from one measurement cycle to the next. For example, when the antenna is repositioned from the right to the left of the vehicle axis, the stepping switch 55 would be automatically changed by the memory to tune the filters 20–22 to the same passband characteristics which they had at the last measurement cycle with the antenna to the left of the vehicle axis. In this manner, no time need be wasted at the beginning of each measurement cycle in finding the proper step switch position. It is assumed that the best guess as to the proper switch position is the position obtained during the previous measurement cycle of the antenna to that side of the vehicle axis.

The output of the filters 60 and 60', which are representative of the spectrum width measurements of the antenna to the right and to the left of the vehicle axis, are supplied to a computer where the velocity and drift angle computations are performed. Prior to the calculation of the velocity and drift angle, it may be desirable to provide corrections for extraneous factors, for example the roll and pitch of the vehicle or the motion of the terrain over which the vehicle is moving (for example, the movement of water). This may be accomplished by suitable servo-mechanisms which form no part of the present invention. These correction signals would be added to the signals at the output of the filters 60—60' before the velocity and the drift angle are computed.

Following the water motion and the roll and pitch corrections, the ground velocity and the drift angle are computed. FIGURE 6 shows one form of a computer which may be used for this function. After the water motion and roll and pitch corrections and other corrections are made, the spectrum width for the antenna on either side of the vehicle axis is given by:

$$\sigma = \frac{1.2V}{\lambda} \Delta \xi \sin \theta$$

or $$\sigma = \frac{1.2V}{D} \sin \theta$$

which equations are similar to Equations 3a and 6 respectively, with the exception of the contant $k$.

As previously shown, the angle $\theta$ has two components and may be expressed as:

$$\theta = \theta_0 + \theta_d$$

these quantities having been previously defined.

If we let $K = 1.2D$, since the antenna beamwidth and the wavelength of the transmission are known, then the two spectrum widths (right and left), can be written as follows:

(7) (right) $\quad \sigma_1 = KV \sin(\theta_{0_1} + \theta_d)$
(8) (left) $\quad \sigma_2 = KV \sin(\theta_{0_2} - \theta_d)$ In the computer of FIGURE 6, the right spectrum width output voltage $\sigma_1$, Equation 7, from the filter 60 is applied to the primary winding of a transformer 65 and the voltage from the output of filter 60' which is representative of the left spectrum width $\sigma_2$, Equation 8, is applied to the primary winding 65' of the same transformer.

The secondary windings of the transformer are connected to produce the sum and difference of the two signals representative of $\sigma_1$ and $\sigma_2$. The difference signal $\sigma_1 - \sigma_2$ is applied to the input of a differential amplifier 67 and is represented by the following equation:

$$(9) \quad \sigma_1 - \sigma_2 = 2KV \cos\left[\frac{\theta_{0_1} + \theta_{0_2}}{2}\right] \sin \theta_d$$

The sum signal from the secondary of the transformer is applied to the input of a differential amplifier 69 and is represented by the following equation:

$$(10) \quad \sigma_1 + \sigma_2 = 2KV \sin\left[\frac{\theta_{0_1} + \theta_{0_2}}{2}\right] \cos \theta_d$$

In order to measure the drift angle $\theta_d$, the difference signal is utilized. The output of the differential amplifier 67, to which the difference signal is applied, drives a motor 70 whose output shaft is connected to a potentiometer 72 which has the sum $\sigma_1 + \sigma_2$ impressed across it as a reference voltage. The potentiometer 72 is located in the feedback loop of the differential servo amplifier 67. The motor 70 is driven until the inputs to the differential amplifier 67 are nulled. When this occurs, the following equation must be true:

(11) $\quad \sigma_1 - \sigma_2 = (\sigma_1 + \sigma_2) K \tan \theta$

Utilizing Equations 9 and 10, Equation 11 becomes:

(12)

$$2KV \cos\left[\frac{\theta_{0_1} + \theta_{0_2}}{2}\right] \sin \theta_d$$
$$= 2KV \sin\left[\frac{\theta_{0_1} + \theta_{0_2}}{2}\right] \cos \theta_d K \tan \theta$$

Rearranging terms gives:

$$(13) \quad \frac{\cos\left[\frac{\theta_{0_1} + \theta_{0_2}}{2}\right]}{\sin\left[\frac{\theta_{0_1} + \theta_{0_2}}{2}\right]} \frac{\sin \theta_d}{\cos \theta_d} = K \tan \theta$$

or $$(14) \quad \cot\left[\frac{\theta_{0_1} + \theta_{0_2}}{2}\right] \tan \theta_d = K \tan \theta$$

If $$K = \cot\left[\frac{\theta_{0_1} + \theta_{0_2}}{2}\right]$$

then $$\theta = \theta_d$$

13

This means that the shaft angle $\theta$ of the motor 70 is a direct measurement of the drift angle $\theta_d$. By reading the shaft position, the angle $\theta_d$ is known.

As seen from Equation 10 the ground velocity of the vehicle would be proportional to $\sigma_1+\sigma_2$, except for the factor $\cos \theta_d$. For $\theta_d=\pm 15°$, $\cos \theta_d=.966$, so that even for this drift angle, which is a relatively large one, a correction of only 3.4% is needed. This correction is supplied as follows. The sum of $\sigma_1+\sigma_2$ is supplied to one input of the differential amplifier. The other input to the amplifier 69 is from a potentiometer 74 which has a constant voltage supplied to it from the A.C. power supply, through a linear potentiometer 75 which is connected to the output shaft of a motor 76. Assuming a constant voltage from the potentiometer 74, the velocity V appears as a shaft position of the motor 76 and therefore the arm of the potentiometer 75 is positioned. The servo loop formed by the amplifier 69, the motor 76 and the potentiometer 75 seeks to null the potentiometer 75 voltage with the $\sigma_1+\sigma_2$ signal. Since the potentiometer 75 is linear, then the rotation of its shaft in closed loop operation is directly proportional to the voltage $\sigma_1+\sigma_2$. To take account of the $\cos \theta_d$ correction in Equation 10 the voltage from potentiometer 72 is not really constant but varies with $\theta_d$, since it is connected to the output shaft of motor 70, so that it is proportional to $\cos \theta_d$. This voltage variation causes the shaft position to truly represent the ground velocity, even for $\theta_d$ not being small.

Therefore it is seen that a system has been provided for the measurement of a vehicle velocity and drift angle which utilizes a doppler radar system in which the doppler measurements are made at fixed positions of the antenna with respect to the axis of the vehicle. To accurately measure the widths of the doppler spectra which are produced due to the wide variation of vehicle velocity and drift angle, a variable frequency tracker system is provided. The operation of the tracker system is completely automatic in nature and accurate measurements of doppler spectra are obtained over a wide range. While the invention has been described with respect to an incoherent type radar system it should be realized that it may readily be adapted for a coherent type radar system.

While a preferred embodiment of the invention has been described above, it will be understood that it is illustrative only and that the invention is limited solely by the appended claims.

What is claimed is:

1. A system for measuring the frequency width of a spectrum comprising signal producing means for producing a predetermined signal in response to a spectrum of a certain frequency width, and means operative in response to a signal other than said predetermined signal to vary the characteristics of said signal producing means in a manner such that said predetermined signal is produced in response to a spectrum of another frequency width.

2. A system for measuring the frequency width of a spectrum comprising means for producing a predetermined signal in response to a spectrum of a certain frequency width and other signals in response to spectra having frequency widths which are different from said certain frequency width, and means operative in response to said other signals to vary the characteristics of said signal producing means in a manner such that said predetermined signal is produced in response to a spectrum having a frequency width different from said certain frequency width.

3. A system for measuring the frequency width of a spectrum comprising means for producing an output signal of a predetermined level in response to a spectrum of a certain frequency width, and means operative in response to output signals different from said output signal of said predetermined level to vary the characteristics of said signal producing means in a manner such that a signal of said predetermined level is produced in response to said spectrum.

4. A system for measuring the frequency width of a spectrum comprising means for producing an output signal of a predetermined level in response to a spectrum of a certain frequency width, means for determining the level of said output signal, and means connected to said determining means for varying the characteristics of said signal producing means in response to a signal having a level other than the level of said signal of predetermined level so that said signal producing means produces an output signal of said predetermined level in response to a spectrum having a frequency width different from said spectrum of said certain frequency width.

5. A system for measuring the frequency width of a spectrum comprising means for producing an output signal of a predetermined level when said spectrum has a certain frequency width and output signals of other levels when said spectrum has a width different from said certain width, means for determining the level of said output signal, and means connected to said determining means and operative in response to output signals of said other levels for changing the characteristics of said signal producing means so that a signal of said predetermined level is produced in response to said spectrum.

6. A system for measuring the frequency width of a spectrum comprising means for producing a signal whose sense and amplitude is related to the frequency width of a spectrum being measured, means for determining when said signal differs from a predetermined signal which is indicative of a spectrum of a certain frequency width, and means connected to said determining means for changing the characteristics of said signal producing means so that said predetermined signal is produced in response to said spectrum being measured.

7. A system for measuring the frequency width of a spectrum comprising tuneable means for producing a signal which is representative of the frequency width of a spectrum being measured, said tuneable means producing a certain signal at various positions in its range of tuning in response to a corresponding spectrum of a predetermined frequency width, and means operative in response to the signal produced by said tuneable means for varying the tuning of said tuneable means so that said certain signal is produced in response to said spectrum being measured.

8. A system as set forth in claim 7 wherein said tuneable means comprises a tuneable filter arrangement.

9. A system for measuring the frequency widths of a spectrum comprising tuneable means having a number of fixed positions for producing a signal which is representative of the frequency width of a spectrum being measured, said tuneable means producing a certain signal at each of its fixed positions in response to a corresponding spectrum of a predetermined frequency width, and means operative in response to the signal produced by said tuneable means for changing the position of said tuning means so that said certain signal is produced in response to said spectrum being measured.

10. A system as set forth in claim 9 wherein said tuneable means comprises an arrangement of filters whose characteristics are different at each of said fixed positions.

11. A system for measuring the frequency width of a spectrum comprising tuneable means having a number of positions for producing a signal which is representative of the frequency width of a spectrum, said tuneable means producing a certain signal in each of said positions in response to a corresponding spectrum of a predetermined frequency width, means for applying a spectrum to be measured to said tuneable means, and means operative in response to the signal produced by said tuneable means for varying the tuning of said tuneable means to a position where said certain signal is produced in response to said spectrum being measured.

12. A system as set forth in claim 11 wherein said tuneable means comprises an arrangement of filters whose respective characteristics are different at each of said positions of said tuning means.

13. A system for measuring the frequency width of a spectrum comprising tuneable means for producing a signal which is representative of the frequency width of a spectrum being measured, said tuneable means producing the same predetermined signal at various positions in its range of tuning in response to a spectrum of a predetermined frequency width and producing other signals when the spectrum width is different from said predetermined frequency width, means for detecting when said other signals are produced, and means connected to said detecting means and responsive to said other signals for varying the tuning of said tuneable means so that said predetermined signal is produced in response to said spectrum being measured.

14. A system as set forth in claim 13 wherein said tuneable means comprises an arrangement of filters whose respective characteristics are different at each of said positions of said tuning means.

15. A doppler radar system adapted for use in a moving vehicle including means for transmitting a beam of energy and for receiving said transmitted beam after reflection, means for forming the doppler spectrum of said received beam of energy, means for measuring the frequency width of the doppler spectrum, said last-named means comprising signal producing means for producing a predetermined signal in response to a doppler spectrum of a certain frequency width, and means operative in response to a signal other than said predetermined signal to vary the characteristics of said signal-producing means in a manner such that said predetermined signal is produced in response to a spectrum of another frequency width.

16. A doppler radar system adapted for use in a moving vehicle including an antenna for transmitting a beam of energy and for receiving said transmitted beam after reflection, means for forming the doppler spectrum of said received beam of energy, means for measuring the frequency width of the doppler spectrum, said last-named means comprising signal producing means for producing a predetermined signal in response to a doppler spectrum of a certain frequency width, means operative in response to a signal other than said predetermined signal to vary the characteristics of said signal-producing means in a manner such that said predetermined signal is produced in response to a spectrum of another frequency width, and means for maintaining the antenna in a fixed position with respect to the axis of the vehicle during the period of the measurement of said doppler spectrum.

17. A doppler radar system adapted for use in a moving vehicle including means for transmitting a beam of energy and for receiving said transmitted beam after reflection, means for forming the doppler spectrum of said received beam of energy, means for measuring the frequency width of the doppler spectrum, said last-named means comprising means for producing an output signal of predetermined level when said doppler spectrum has a certain frequency width and output signals of other widths when said doppler spectrum has a width different from said certain width, means for determining the level of said output signal, and means connected to said determining means and operative in response to output signals of said other levels for changing the characteristics of said signal producing means so that a signal of said predetermined level is produced in response to said doppler spectrum.

18. A doppler radar system adapted for use in a moving vehicle including an antenna for transmitting a beam of energy and for receiving said transmitted beam after reflection, means for forming the doppler spectrum of said received beam of energy, means for measuring the frequency width of the doppler spectrum, said last-named means comprising means for producing an output signal of predetermined level when said doppler spectrum has a certain frequency width and output signals of other levels when said doppler spectrum has a width different from said certain width, means for determining the level of said output signal, means connected to said determining means and operative in response to output signals of said other levels for changing the characteristics of said signal producing means so that a signal of said predetermined level is produced in response to said doppler spectrum, and means for maintaining the antenna in a fixed position with respect to the axis of the vehicle during the period of the measurement of said doppler spectrum.

19. A doppler radar system adapted for use in a moving vehicle including means for transmitting a beam of energy and for receiving said transmitted beam after reflection, means for forming the doppler spectrum of said received beam of energy, means for measuring the frequency width of the doppler spectrum, said last-named means comprising tunable means for producing a signal which is representative of the frequency width of the doppler spectrum being measured, said tunable means producing a certain signal at various positions in its range of tuning in response to a corresponding doppler spectrum of a predeterminad frequency width, and means operative in response to the signal produced by said tunable means for varying the tuning of said tunable means so that said certain signal is produced in response to said doppler spectrum beam being measured.

20. A doppler radar system adapted for use in a moving vehicle including an antenna for transmitting a beam of energy and for receiving said transmitted beam after reflection, means for forming the doppler spectrum of said received beam of energy, means for measuring the frequency width of the doppler spectrum, said last-named means comprising tunable means for producing a signal which is representative of the frequency width of the doppler spectrum being measured, said tunable means producing a certain signal at various positions in its range of tuning in response to a corresponding doppler spectrum of a predetermined frequency width, means operative in response to the signal produced by said tunable means for varying the tuning of said tunable means so that said certain signal is produced in response to said doppler spectrum being measured, and means for maintaining the antenna in a fixed position with respect to the axis of the vehicle during the period of the measurement of said doppler spectrum.

21. A doppler radar system adapted for use in a moving vehicle including means for transmitting a beam of energy and for receiving said transmitted beam after reflection, means for forming the doppler spectrum of said received beam of energy, means for measuring the frequency width of the doppler spectrum, said last-named means comprising tunable means having a number of fixed positions for producing a signal which is representative of the frequency width of the doppler spectrum being measured, said tunable means producing a certain signal at each of its fixed positions in response to a corresponding doppler spectrum of a predetermined frequency width, and means operative in response to the signal produced by said tunable means for changing the position of said tuning means so that said certain signal is produced in response to said doppler spectrum being measured.

22. A doppler radar system adapted for use in a moving vehicle including an antenna for transmitting a beam of energy and for receiving said transmitted beam after reflection, means for forming the doppler spectrum of said received beam of energy, means for measuring the frequency width of the doppler spectrum, said last-named means comprising tunable means having a number of fixed positions for producing a signal which is representative of the frequency width of the doppler spectrum being measured, said tunable means producing a certain signal at each of its fixed positions in response to a corresponding doppler spectrum of a predetermined frequency width, means operative in response to the signal produced by said tunable means for changing the position of said tuning means so that said certain signal is produced in response to said doppler spectrum being measured, and means for maintaining the antenna in a fixed position with respect to the axis of the vehicle during the period of the measurement of said doppler spectrum.

23. A doppler radar system adapted for use in a moving vehicle including means for transmitting a beam of energy and for receiving said transmitted beam after reflection, means for forming the doppler spectrum of said received beam of energy, means for measuring the frequency width of the doppler spectrum, said last-named means comprising tunable means for producing a signal which is representative of the frequency width of the doppler spectrum being measured, said tunable means producing the same predetermined signals at various positions in its range of tuning in response to a doppler spectrum of a predetermined frequency width and producing other signals when the doppler spectrum is not of said predetermined frequency width, means for detecting when said other signals are produced, and means connected to said detecting means and responsive to said other signals for varying the tuning of said tunable means so that said predetermined signal is produced in response to said doppler spectrum being measured.

24. A doppler radar system adapted for use in a moving vehicle including an antenna for transmitting a beam of energy and for receiving said transmitted beam after reflection, means for forming the doppler spectrum of said received beam of energy, means for measuring the frequency width of the doppler spectrum, said last-named means comprising tunable means for producing a signal which is representative of the frequency width of the doppler spectrum being measured, said tunable means producing the same predetermined signals at various positions in its range of tuning in response to a doppler spectrum of a predetermined frequency width and producing other signals when the doppler spectrum is not of said predetermined frequency width, means for detecting when said other said signals are produced, means connected to said detecting means and responsive to said other signals for varying the tuning of said tunable means so that said predetermined signal is produced in response to said doppler spectrum being measured, and means for maintaining the antenna in a fixed position with respect to the axis of the vehicle during the period of the measurement of said doppler spectrum.

25. A doppler radar system for use in a moving vehicle comprising an antenna for transmitting energy and for receiving a portion of said transmitted energy after reflection, means for positioning said antenna at a fixed location on each side of the axis of said vehicle, means for forming the doppler spectrum of said received beam of energy when said antenna is positioned on each side of the vehicle axis, and means for measuring the width of the spectra formed when the antenna is in said positions.

26. A doppler radar system for use in a moving vehicle comprising an antenna for transmitting energy and for receiving a portion of said transmitted energy after reflection, means for positioning said antenna at a fixed location on each side of the axis of said vehicle, means for forming the doppler spectrum of said received beam of energy when said antenna is positioned on each side of the vehicle axis, and means for measuring the width of the spectra formed when the antenna is in said positions, said last named means including signal producing means for producing a predetermined signal in response to a spectrum of a certain frequency width, and means operative in response to a signal other than said predetermined signal to vary the characteristics of said signal producing means in a manner such that said predetermined signal is produced in response to a spectrum of another frequency width.

27. A doppler radar system for use in a moving vehicle comprising an antenna for transmitting energy and for receiving a portion of said transmitted energy after reflection, means for positioning said antenna at a fixed location on each side of the axis of said vehicle, means for forming the doppler spectrum of said received beam of energy when said antenna is positioned on each side of the vehicle axis, and means for measuring the width of the spectra formed when the antenna is in said position, said last named means including tuneable means for producing a signal which is representative of the frequency width of a spectrum being measured, said tuneable means producing the same predetermined signal at various positions in its range of tuning in response to a spectrum of a predetermined frequency width and producing other signals when the spectrum width is different from said predetermined frequency width, means for detecting when said other signals are produced, and means connected to said detecting means and responsive to said other signals for varying the tuning of said tuneable means so that said predetermined signal is produced in response to said spectrum being measured.

28. A doppler radar system for use in a moving vehicle, said vehicle having an axis on which an antenna for transmitting energy and for receiving said transmitted energy after reflection is located, means for positioning said antenna at a fixed angular position on each side of said axis for a period of time, means for forming the doppler spectrum of said received beam of energy during the periods when said antenna is fixedly positioned on each side of said axis, and means for measuring the width of the spectrum formed when said antenna is so positioned.

29. A doppler radar system for use in a moving vehicle, said vehicle having an axis on which an antenna for transmitting energy and for receiving said transmitted energy after reflection is located, means for positioning said antenna at a fixed angular position on each side of said axis for a period of time, means for forming the doppler spectrum of said received beam of energy during the periods when said antenna is fixedly positioned on each side of said axis, and means for measuring the width of the spectrum formed when said antenna is so positioned, said last named means including means for producing an output signal of a predetermined level in response to a spectrum of a certain frequency width, and means operative in response to output signals different from said output signal of said predetermined level to vary the characteristics of said signal producing means in a manner such that a signal of said predetermined level is produced in response to said spectrum.

30. A doppler radar system for use in a moving vehicle, said vehicle having an axis on which an antenna for transmitting energy and for receiving said transmitted energy after reflection is located, means for positioning said antenna at a fixed angular position on each side of said axis for a period of time, means for forming the doppler spectrum of said received beam energy during the periods when said antenna is fixedly positioned on each side of said axis, and means for measuring the width of the spectrum formed when said antenna is so positioned, said last named means including tuneable means having a number of fixed positions for producing a signal which is representative of the frequency width of a spectrum being measured, said tuneable means producing a certain signal at each of its fixed positions in response to a corresponding spectrum of a predetermined frequency width, and means operative in response to the signal produced by said tuneable means for changing the position of said tuning means so that said certain signal is produced in response to said spectrum being measured.

31. A doppler radar system for use in a moving vehicle, said vehicle having an axis on which an antenna for transmitting energy and for receiving said transmitted energy after reflection is located, means for positioning said antenna at a fixed angular position on each side of said axis for a period of time, means for forming the doppler spectrum of said received beam of energy during the periods when said antenna is fixedly positioned on each side of said axis, and means for measuring the width of the spectrum formed when said antenna is so positioned, said last named means including a plurality of trackers, each of said trackers constructed with characteristics to produce a first signal in response to a spectrum of a receptive predetermined frequency width and other signals in response to spectra which are not of said respective predetermined frequency width, means for applying a spectrum to be measured to one of said trackers, and means responsive to the production of said other signals by said one tracker for applying said spectrum to be measured to another tracker whose characteristics are more closely related to the production of said first signal.

32. A system for measuring the frequency width of a spectrum comprising a plurality of trackers, each of said trackers constructed with characteristics to produce a first signal in response to a spectrum of a respective predetermined frequency width and other signals in response to spectra which are not of said respective predetermined frequency width, means for applying a spectrum to be measured to one of said trackers, and means responsive to the production of said other signals by said one tracker for applying said spectrum to be measured to another tracker whose characteristics are more closely related to the production of said first signal.

33. A system for measuring the frequency width of a spectrum comprising a plurality of trackers, each of said trackers constructed with characteristics to produce a first signal in response to a spectrum of a respective predetermined frequency width and other signals in response to spectra which are not of said respective predetermined frequency width, means for applying a spectrum to be measured to one of said trackers, and means responsive to the production of said other signals to make said applying means successively apply said spectrum to be measured to other trackers, said last named means being operative until a tracker produces said first signal in response to the spectrum being measured.

References Cited in the file of this patent

UNITED STATES PATENTS

| | | |
|---|---|---|
| 2,680,228 | Smith | June 1, 1954 |
| 2,763,840 | Pfleger | Sept. 18, 1956 |